United States Patent [19]

Idesawa et al.

[11] Patent Number: 4,457,626

[45] Date of Patent: Jul. 3, 1984

[54] APPARATUS FOR DETERMINING THE POSITION OF A MARK ON AN OBJECT

[75] Inventors: Masanori Idesawa, Wako; Toyohiko Yatagai, Tokyo, both of Japan

[73] Assignee: Rikagaku Kenkyusho, Wako, Japan

[21] Appl. No.: 265,576

[22] Filed: May 20, 1981

[30] Foreign Application Priority Data

May 28, 1980 [JP] Japan ................................. 55-71044

[51] Int. Cl.$^3$ ............................................. G01B 11/24
[52] U.S. Cl. ................................... 356/376; 350/96.28
[58] Field of Search ................... 356/376, 1; 350/96.28

[56] References Cited

U.S. PATENT DOCUMENTS

| | | | |
|---|---|---|---|
| 3,170,980 | 2/1965 | Pritchard | 350/96.28 |
| 3,740,112 | 6/1973 | Lundgren | 350/96.28 |
| 4,125,317 | 11/1978 | Gordon et al. | 356/376 |
| 4,146,926 | 3/1979 | Clerget et al. | 356/376 |
| 4,183,672 | 1/1980 | Raber et al. | 356/376 |
| 4,299,491 | 11/1981 | Waters et al. | 356/376 |

OTHER PUBLICATIONS

"Zoomable Kaleidoscopic Mirror Tunnel," Applied Optics, J. H. Myer, vol. 10, No. 9, pp. 2179-2182 (1971).
"Feature Extraction of 3-Dimensional Objects with a Laser Tracker," Transaction of the Installment and Control Engineers, vol. 10, No. 5, pp. 599-605 (1974).
Krolak et al., "The Optical Tunnel-A Versatile Electrooptical Tool" Journal of the SMPTE, vol. 72, No. 3 (Mar. 1963) pp. 177-180.

Primary Examiner—R. A. Rosenberger
Attorney, Agent, or Firm—Brumbaugh, Graves, Donohue & Raymond

[57] ABSTRACT

Disclosed is an apparatus for determining the position of a mark on an object to be determined in terms of configuration, movement or any other geometrical or physical condition, using a photosensitive element and a light reflecting body in such a combination that the reflecter intercepts and casts to the photo-sensitive area of the element the beam of light from the mark, which beam of light would, otherwise, travel apart from the photo-sensitive element, not falling thereon. Thus, the measuring range of the photo-sensitive element is apparently extended, or otherwise the accuracy with which the mark position is determined is substantially improved.

2 Claims, 5 Drawing Figures

APPARATUS FOR DETERMINING THE POSITION OF A MARK ON AN OBJECT

This invention relates to an apparatus for determining the position of a mark on an object or body to be determined in terms of a geometrical of physical condition.

Recently there has been an ever increasing demand for determining the position of a mark, a bright spot, a luminescent piece or any other marking appearing on an object or body without contacting the same and for determining the geometrical or physical condition of the object, such as the shape or configuration of the object, the gradient of the object, or the movement of the object in terms of the determined positions determined of the mark on the object. The word "mark" should be understood as indicating a particular selected point on an object or body such as affixed or impressed sign, projected light spot and any other illuminated or self-illuminating (or luminescent) thing.

The precision with which the geometrical or physical condition of an object or body is determined depends largely on the precision with which the position of the mark on the object or body is determined. A television camera, a photo-semiconductor, a solid state image sensing device, and the like may be used for the purpose of determining the position of the mark on the object. Thus, the accuracy of the final measuring result will be much influenced by the precision of such photodetector and by the precision of associated apparatus as later described.

As a matter of course, the effective measuring range of a photo-sensitive element can be extended by enlarging the photo-sensitive area of the element. It is, however, inhibitively difficult to assure the homogeneity over the whole enlarged photo-sensitive area in producing the element. Another problem is that the yield rate drastically decreases in the case where high-precision photo-sensitive elements are required. Even if a high-precision element is available, it cannot be used to the full accuracy without using associated power supply and amplifiers whose precision is fairly close to the precision of the photo-sensitive element. It is, however, difficult to improve the precision of the power supply and amplifier as high as the precision of the photo-sensitive element, and such precision power supply and amplifiers would be inhibitively expensive. This is the case with an analogue-to-digital converter which is necessary to give a mark position in a digital form. As an alternative for the analogue-to-digital converter a solid state image forming device, which comprises an array of numerous photo-diode, may be used to present pieces of digital information. This alternative reduces the problem with the analogue-to-digital converter, but another problem is that it is difficult to produce a solid state image sensing device of enough precision.

One object of this invention is to provide an apparatus which is capable of determining the position of a mark on an object over an extended range of measurement.

Another object of this invention is to provide an apparatus which is capable of determining the position of a mark on an object with an increased accuracy.

To attain this and other objects a mark-position determining apparatus according to this invention includes a light reflecting element or body so positioned as to intercept and cast to the detecting area of a photo-sensitive element the beam of light from an object to be determined, which beam of light otherwise would not fall on the photo-sensitive area but travel apart therefrom, thus enlarging apparently the effective area of the photo-sensitive element.

This invention will be better understood from the following description which is made with reference to the accompanying drawings.

Figure 1:
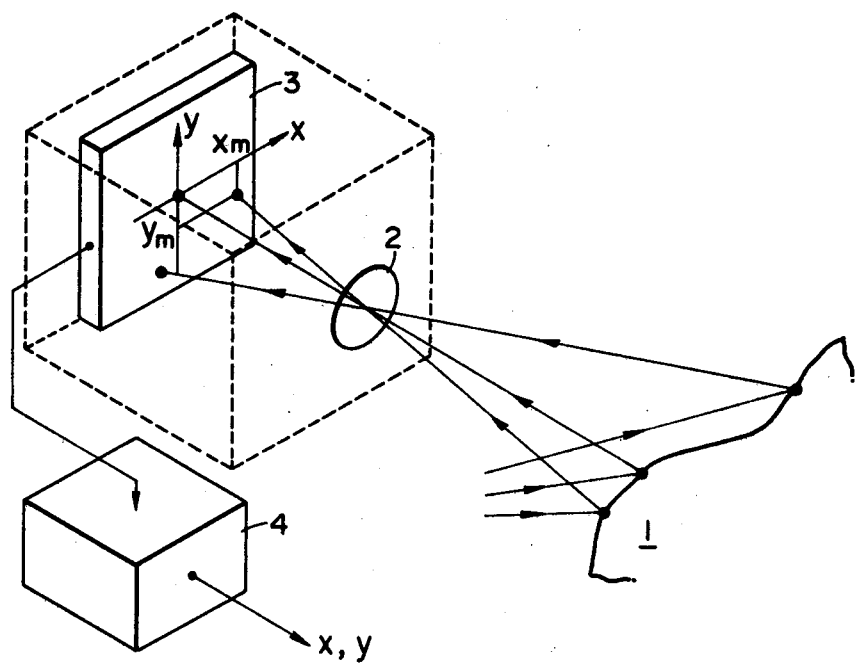
FIG. 1 shows a conventional mark-position detecting apparatus.
Figure 2:
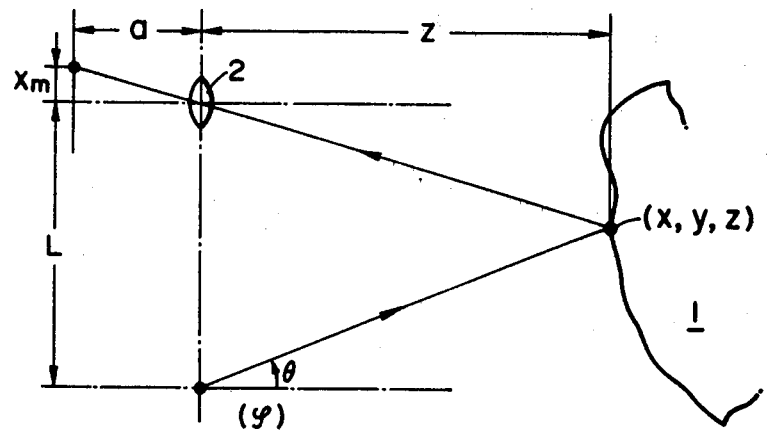
FIG. 2 shows certain parameters by means of which the position of a mark on an object can be determined.

Referring to FIG. 1, there is shown a conventional mark-position detecting apparatus. As shown in FIG. 1 an object 1 to be determined, for instance, in terms of configuration is swept by a beam of light, and the reflected beam of light from the object 1 passes through a lens 2 to fall on a photo-sensitive plane 3. The lens 2 and the photo-sensitive plane 3 together constitute a light spot detecting section, and an associated coordinate determining section 4 determines the instantaneous coordinate position of the bright spot on the photo-sensitive plane from the following equations:

$$x = \frac{x_m}{a} \cdot z,$$

$$y = \frac{y_m}{a} \cdot z \ (= z \tan \phi), \text{ and}$$

$$z = \frac{L}{\left( \tan \theta \frac{x_m}{a} \right)}$$

where "$\theta$" is a projection angle in the x-z plane and "$\phi$" is a projection angle with respect to the x-z plane (see FIG. 2).

Figure 3:
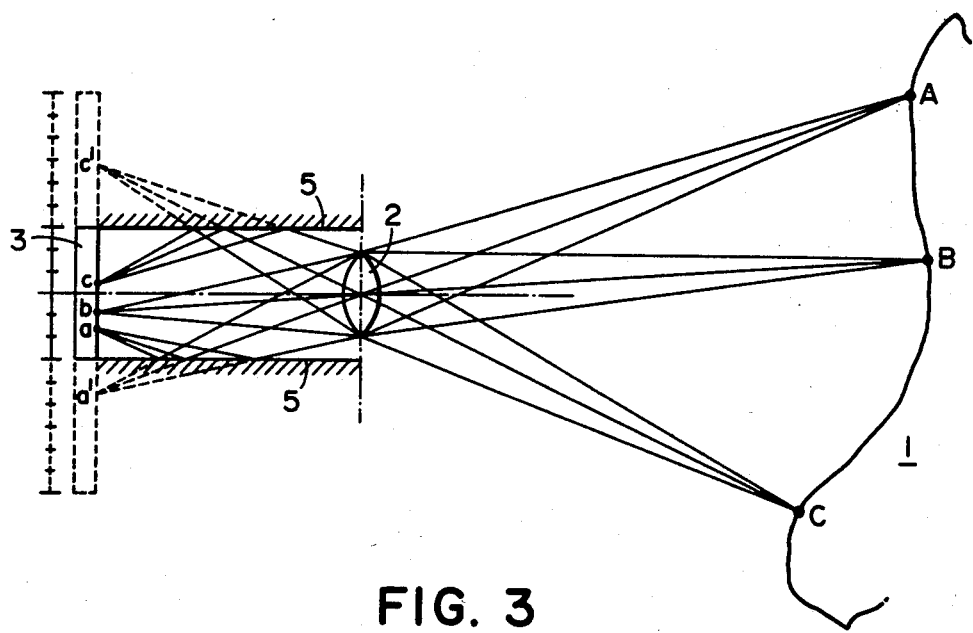
FIG. 3 shows the principle of the invention according to which the position of a mark is determined.

Referring to FIG. 3, there is shown the principle of this invention. As shown in FIG. 3, a light reflecting body 5 is put around a photo-sensitive element 3. With this arrangement the effective photo-sensitive area of the element 3 could be extended as shown by broken lines. For instance, marks on different positions "A", "B" and "C" on an object 1 are detected on corresponding points "a", "b" and "c" on the photo-sensitive plane respectively. If there were no light reflecting body 5, the images of the marks "A" and "C" would fall on places exterior to the photo-sensitive area as indicated by broken lines, and therefore, could not be detected by the photo-sensitive element.

If pieces of information are given as to which side of the reflecting body reflects the beams of light from the marks "A" and "C" and as to how often the beams of light are reflected, the positions of image points "a" and "c" can be converted to the positions of points "a'" and "c'" with recourse to the mathematical method as follows.

Figure 4:
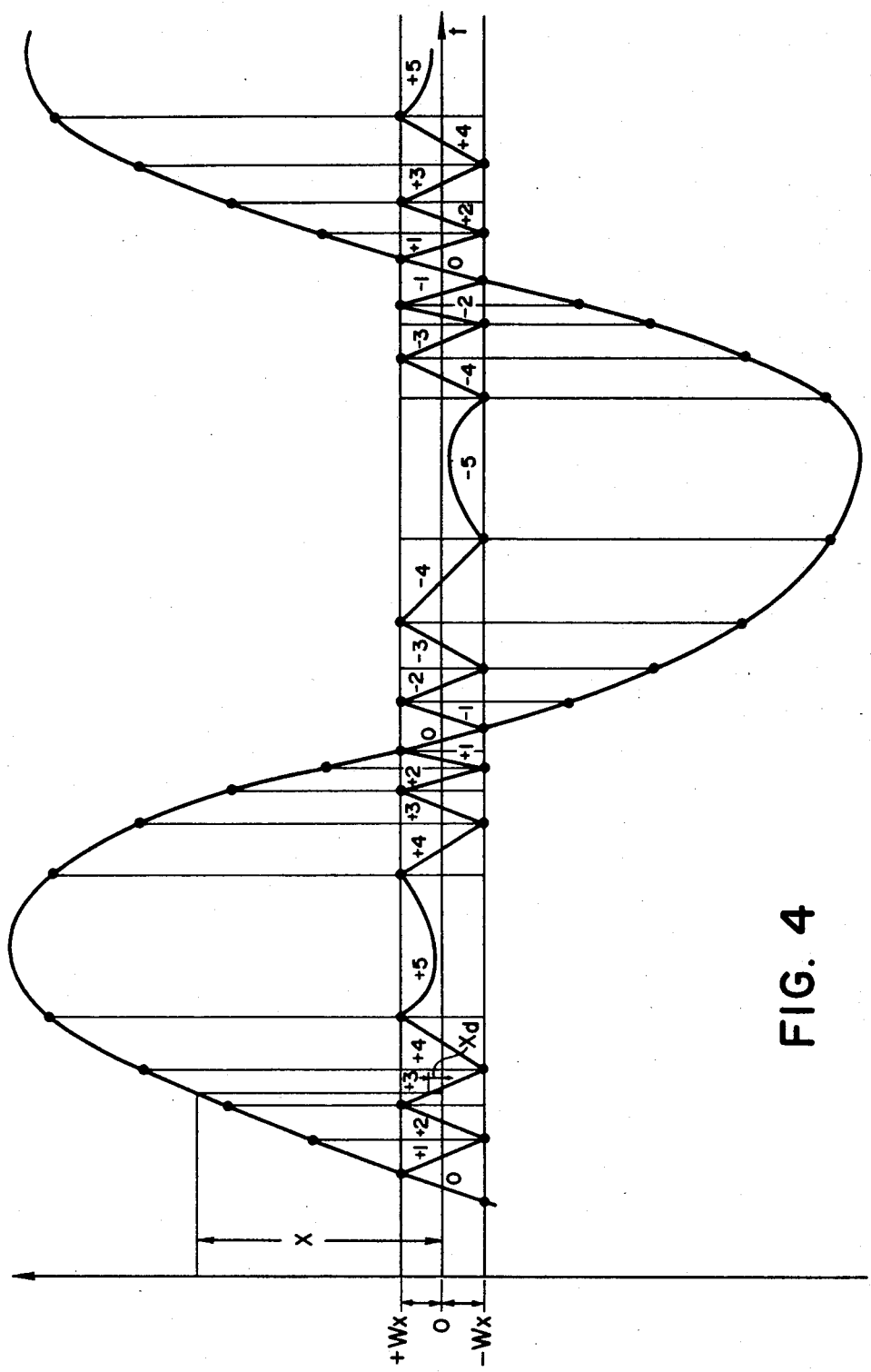
FIG. 4 shows how the position of a bright spot on an object is related with the position of the reflection of the bright spot on the photo-sensitive area.

In FIG. 4, on a sinusoidal wave there are those points on which beams of light from particular marks on a body fall. The actual range of the photo-sensitive element extends from $-W_x$ to $+W_x$. In FIG. 4, the numerical figures appearing between the opposite sides of the reflecting body represent the times of reflection, and are referred to as reflection time index "$n_x$" or "$n_y$". The sign of the reflection time index shows on which side the first reflection occurs, upper or lower side, and the figure of the reflection time index shows how often the reflection occurs. Thus, for instance, if the reflection time index is $+3$, it means that the beam of light reflects on the upper side, the lower side and finally the upper side of the reflecting body. Also, the sign represents the side of the photo-sensitive area (upper or lower part thereof) to which the beam of light is directed.

An outer-range position "x" on which the beam of light falls can be determined in terms of the coordinate "$x_d$" in the actual photo-sensitive area and of the reflection time index "$n_x$" ($+3$) from the following equation:

$$x = 2n_x w_x + (-1)^{|n_x|} \cdot x_d$$

$$(\text{or } y = 2n_y w_y + (-1)^{|n_y|} \cdot y_d)$$

Table 1 shows how reflection time indicates $n_x$ and $n_y$ and extended sections in the orthogonal coordinate domain are related with each other, and in connection with this Table 2 shows in which directions the mark moves.

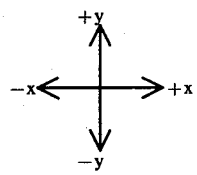

| −2, +2 | −1, +2 | 0, +2 | +1, +2 | +2, +2 |
|---|---|---|---|---|
| −2, −1 | −1, +1 | 0, +1 | +1, +1 | +2, +1 |
| −2, 0 | −1, 0 | $n_x, n_y$ 0, 0 | +1, 0 | +2, 0 |
| −2, −1 | −1, −1 | 0, −1 | +1, −1 | +2, −1 |
| −2, −2 | −1, −2 | 0, −2 | +1, −2 | +2, −2 |

TABLE 1

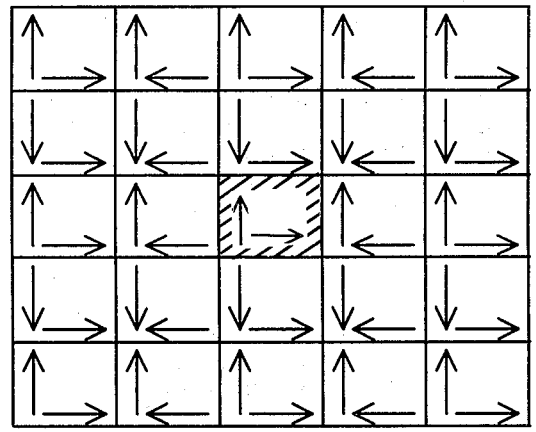

TABLE 2

In order to determine the outer-range position of the light spot from the corresponding inner-range position it is necessary to obtain the reflection time indexes $n_x$ and $n_y$ in "X" and "Y" directions. Stated otherwise, it is necessary to know how often and on which sides of the reflecting body the reflection has occured before the light spot falls on the photoconductive element. Necessary information can be obtained in consideration of (1) the continuity of movement of the mark, (2) in consideration of the regularity in the movement of the mark or (3) with the aid of another position detecting apparatus.

Figure 5:
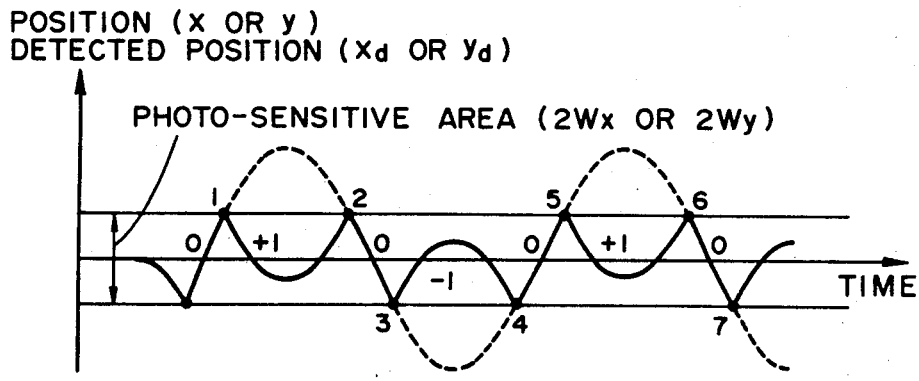
FIG. 5 shows the trace of a moving bright spot and the corresponding trace of its reflection.

(1) With regard to the continuity of movement of the mark:

Assuming that a mark is put on a given point of an object to be determined in terms of movement, the speed at which the object and hence the mark moves will vary in a continuous manner, and therefore it may be justly judged that if the speed varies in noncontinuous manner (that is, if the direction in which the mark image moves reverses as indicated at points 1, 2, 3, 4 ---- in FIG. 5), the reflecting condition (reflection time index) changes. If the reflection time index is determined in one selected section, those in the other sections can be determined from Table 1. Then, the outer-range position of the light spot can be determined from the above equation.

(2) With regard to the regularity in the movement of the mark:

In the case where an object is determined in terms of configuration by sweeping the object with a beam of light, the movement of the light spot can be controlled, and the reflection time index can be determined with reference to the regularity with which the movement of the beam of light is controlled. For instance in the case where a light spot is shifted in a particular direction, each time the direction in which the light spot travels in the inner-range of the photo-sensitive element reverses, the reflection time index changes. A reflection time index is determined in one selected section, and then the reflection time indexes can be determined in the remaining sections. Thus, the over- or inner-range position of the light spot can be mathematically determined.

(3) With respect to the aid of another position detecting apparatus:

Another position detecting apparatus, such as a T.V. camera tube, is used only for the sake of detecting in which section the mark stands. Then with reference to the so-detected section the reflection time indexes $n_x$ and $n_y$ in the remaining sections are determined. The auxiliary position detecter as used may be of a less accuracy. This method can be used in combination with those numbered (1) and (2) above. If this method (3) is used to determine the absolute reflection time indexes in a given section, the absolute or real position of the mark can be accordingly determined.

What is claimed is:

1. An apparatus for determining the position of at least one mark on an object which is to be determined in terms of configuration, movement or any other geometrical or physical condition comprising:
   a photo-sensitive element;
   a light reflecting body located in the vicinity of said photo-sensitive element in such a position that a beam of light emanating from a mark directly towards said photo-sensitive element is allowed to fall on the photo-sensitive area of said element and a beam of light emanating from said mark when displaced or emanating from a different mark on said object directly towards an orthogonal coordinate domain around said photo-sensitive area is reflected at least once before being directed to said photo-sensitive area; and
   means for determining the coordinates x and y of the mark on the object from the coordinates $x_d$ and $y_d$ of the detected position of the beam on the photo-sensitive element, the location $w_x$ and $w_y$ of the light-reflecting body, and the number of reflections $n_x$ and $n_y$ of the beam by the light-reflecting body in accordance with the equations:

$$x = 2n_x w_x + (-1)^{|n_x|} \cdot x_d$$

and, $$y = 2n_y w_y + (-1)^{|n_y|} \cdot y_d.$$

2. The apparatus of claim 1 wherein said photo-sensitive element is a photo-semiconductor device, a television camera, or an image sensor.

3. The apparatus of claim 1 additionally comprising means for determining which section of said orthogonal coordinate domain the beam of light falling on and detected by said photo-sensitive element should have fallen on and for determining whether the beam of light falling on and detected by said photo-sensitive element is one travelling directly towards said photo-sensitive element.

4. The apparatus of claim 3 wherein said determining means comprises means for making use of continuity of the movement of said mark for detecting any transistion of the image of said mark from a section to an adjacent section in said orthogonal coordinate domain.

5. The apparatus of claim 3 wherein said determining means comprises means for making use of regularity in the movement of said mark for determining which section the beam of light finally falling on said photo-sensitive element should have fallen on.

6. The apparatus of claim 1 in which said light-reflecting body comprises a mirror.

7. The apparatus of claim 1 wherein said light-reflecting body comprises a glass surface.

8. The apparatus of claim 1 wherein said light-reflecting body comprises a plastic plate.

9. The apparatus of claim 1 wherein said light-reflecting body comprises the surface of a still liquid bath.

* * * * *